(12) United States Patent
Mylet (10) Patent No.: US 8,874,256 B2
(45) Date of Patent: Oct. 28, 2014

(54) MONITORING AND CONTROL SYSTEM FOR COMMODITY LOADING

(75) Inventor: Neil T Mylet, Camden, IN (US)

(73) Assignee: Loadout Technologies LLC, Camden, IN (US)

( * ) Notice: Subject to any disclaimer, the term of this patent is extended or adjusted under 35 U.S.C. 154(b) by 726 days.

(21) Appl. No.: 12/543,175

(22) Filed: Aug. 18, 2009

(65) Prior Publication Data

US 2010/0042248 A1 Feb. 18, 2010

Related U.S. Application Data

(60) Provisional application No. 61/089,699, filed on Aug. 18, 2008.

(51) Int. Cl.
| | |
|---|---|
| G06F 19/00 | (2011.01) |
| B65G 67/04 | (2006.01) |
| B65G 67/06 | (2006.01) |

(52) U.S. Cl.
CPC .................................... B65G 67/06 (2013.01); B65G 67/04 (2013.01)
USPC ........ 700/214; 340/5.54; 340/5.65; 340/5.72; 348/89; 701/300; 709/226

(58) Field of Classification Search
USPC ........................................................ 700/214
See application file for complete search history.

(56) References Cited

U.S. PATENT DOCUMENTS

| | | | | |
|---|---|---|---|---|
| 4,072,929 | A * | 2/1978 | Garmong ...................... | 340/5.54 |
| 6,097,425 | A * | 8/2000 | Behnke et al. .................. | 348/89 |
| 6,549,130 | B1 * | 4/2003 | Joao ......................... | 340/539.14 |
| 2001/0038328 | A1 * | 11/2001 | King et al. .................... | 340/5.64 |
| 2003/0007665 | A1 | 1/2003 | Ponsot et al. | |
| 2003/0141165 | A1 | 7/2003 | Reznik et al. | |
| 2003/0174207 | A1 * | 9/2003 | Alexia et al. .................... | 348/89 |
| 2005/0199470 | A1 | 9/2005 | Buchi | |
| 2006/0080442 | A1 * | 4/2006 | Ferguson et al. ............. | 709/226 |
| 2006/0150602 | A1 * | 7/2006 | Stimmann ...................... | 56/10.5 |

(Continued)

FOREIGN PATENT DOCUMENTS

JP 55084725 6/1980

OTHER PUBLICATIONS

Bateman. Rapid Load-Out Stations. Mar. 26, 2006. www.batemanengineering.com.

*Primary Examiner* — Gene Crawford
*Assistant Examiner* — Kyle Logan
(74) *Attorney, Agent, or Firm* — SmithAmundsen LLC; Dennis S. Schell (57) ABSTRACT

A system for in-vehicle monitoring and control of commodity loading, such a grain or loose or fluid materials, from a storage bin to a transport bin using a loading system, includes a loading system control device and a user interface device capable of mutual wireless communication. The system improves safety by eliminating the need for operators to crawl up the side of vehicle in order to check levels of commodity in the transport bin, while also trying to move the transport bin as required. The loading system control device includes a logic switching unit for selectively operating the loading system that transfers the commodity from the storage bin; one or more cameras providing visual feeds of the loading of commodity into the transport bin; and a security or safety feature. The user interface device includes a display for displaying the visual feeds and control switches for operating the loading system.

20 Claims, 8 Drawing Sheets

(56) References Cited

U.S. PATENT DOCUMENTS

| | | |
|---|---|---|
| 2006/0251502 A1 | 11/2006 | Scharfenberger |
| 2007/0103271 A1* | 5/2007 | King et al. ................ 340/5.72 |
| 2008/0133046 A1* | 6/2008 | Tourdot et al. ............... 700/214 |
| 2009/0099775 A1* | 4/2009 | Mott et al. .................... 701/300 |
| 2009/0143923 A1* | 6/2009 | Breed ............................... 701/1 |
| 2010/0127824 A1* | 5/2010 | Moschl et al. ............... 340/5.65 |

* cited by examiner

MONITORING AND CONTROL SYSTEM FOR COMMODITY LOADING

BACKGROUND

The present disclosure relates to systems for loading loose or fluid materials into containers, and more specifically, to systems for loading bulk materials such as grain into transport bins such as grain trucks.

Prior system for loading loose or fluid bulk materials (collectively "commodity" or "commodities") from storage bins into transport bins generally include augers, belts and/or gates (flow devices), at least some of which are operated by electric motors or other actuators, that control the flow of commodity directed into the transport bin. The actuators that thereby initiate and terminate the flow of commodity into the transport bin are generally operated by simple on-off switches or other controls. However, the vehicle carrying the transport bin, such as a tractor-trailer combination, must often be repositioned periodically during the loading process to ensure various sections of the transport bin are filled to capacity, thus requiring the operator to continuously climb in and out of the vehicle cab. Additionally, the location of the controls for the flow devices often lacks visual line of sight to the interior of the bin.

Specific to agriculture, there are over 500,000 trailers dedicated to grain transport in the US, the average age of US farmers is about 55 years, and there is increasing pressure to move large quantities of commodities within short periods of time, thus, the loading process can be burdensome and hazardous to the operator, creating issues of safety. With commodity loading systems that provide an extremely high loading rate, for example, from an overhead bin that uses a simple control gate and gravity for moving commodity into the transport bin, it is feasible to load approximately 1,000 bushels (28 tons) of grain in just over one minute. In order to safely operate such systems, two operators are required. One operator turns the gate on and off to regulate flow, and another operator periodically repositions the vehicle as various sections of the transport bin become full. Such labor costs and inefficiencies of requiring two operators are often not acceptable in industry. Dust and noise can further complicate the loading task and increase risk. Additionally, inclement weather, such as snow or rain, combined with extended loading time required if using only one operator can degrade the quality of the commodity being loaded.

Therefore, there is a need to provide for safer, more effective monitoring and control of loading of commodities into transport bins.

SUMMARY

The present invention may comprise one or more of the following features and combinations thereof.

One illustrative embodiment of a system for in-vehicle monitoring and controlling commodity loading, such a grain or loose or fluid materials, from a storage bin to a transport bin using a loading system associated with the storage bin includes a loading system control device and a wireless user interface device mutually capable of wireless communication. The loading system device can include one or more of a logic switching unit for selectively operating the loading system, for example, including actuators such as an auger, a belt and/or an outlet gate that control transfer of the commodity from the storage bin; a wireless receiver for receiving control signals for selectively activating the loading system; one or more imaging devices providing visual feeds of the loading of commodity into the transport bin; a wireless transmitter for transmitting the visual feeds to the user interface device; a safety or security device; and one or more status indicators.

The user interface device can include a wireless receiver and display for receiving and selectively displaying the visual feeds; control switches for providing control signals for operating the loading system; a wireless transmitter for transmitting the control signals to the loading system control device; and the control switches and wireless transmitter can be in one or more housings separate from or selectively separable from the wireless receiver and display.

The illustrative embodiment improves safety by eliminating the need for operators to crawl up the side of vehicle in order to check levels of commodity in the transport bin, while also trying to move the vehicle and associated bin as required, and turning on and off the flow of commodity. Efficiency is also improved by reducing the number of operators required to perform loading on some systems, for example, high flow rate transfer systems. Health issues are also addressed by eliminating the need for the individual loading to be outside in the airborne dust and other allergens caused from the loading process.

A simple switch actuation can optionally allow an operator to select from one or more visual feeds showing where the vehicle and transport bin is positioned relative to the commodity outlet of the loading system and to view the visual feed on a display in the vehicle cab. Loading systems actuator controls are also located in the vehicle cab and coupled by wireless with the loading system. The illustrative system thus provides a visual display and loading control switches used to monitor and control the loading of the transport bin in a safe, efficient manner, namely from within the vehicle cab, thereby allowing one operator to monitor loading, control loading, and reposition the vehicle or loading spout as required to fill all sections of the transport bin to the desired capacity.

One illustrative method for filling a transport bin with commodity from one of a plurality of storage bins, includes the steps in this or an alternative order, from the cab of the transport bin, selecting one of the plurality of storage bins; providing to the cab of the transport bin a visual feed of the area under the outlet gate of the selected one of the plurality of storage bins; positioning the transport bin under the outlet of a selected one of the plurality of storage bins; from the cab, activating the flow of commodity through the outlet and into the transport bin; from the cab, monitoring the visual feed, thereby monitoring the filling of the transport bin; from the cab, as required, repositioning of the transport bin or the outlet; and from the cab, deactivating the flow of commodity from the outlet.

Commodities that may be loaded using the illustrative system may include, for example, grain, coal, limestone, organic waste, potash, iron ore, scrap steel, borax, paper and other wood or fiber products, concrete, asphalt, DDG's, oil shale, phosphate, ag coke, fertilizer, soda ash, plastics, trash, and mulch.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

For the purposes of promoting and understanding the principals of the invention, reference will now be made to one or more illustrative embodiments illustrated in the drawings and specific language will be used to describe the same.

Figure 3:
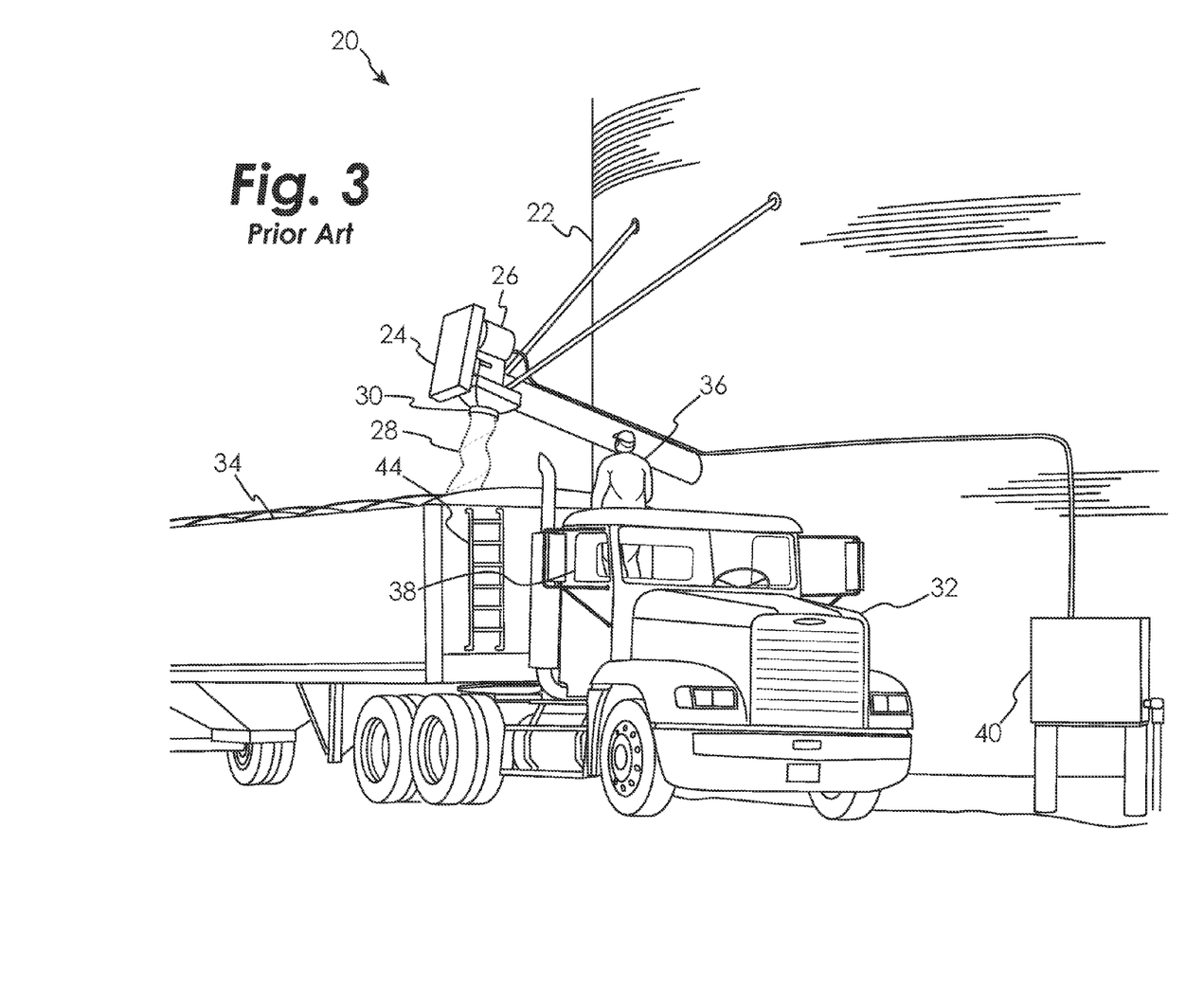
FIG. 3 illustrates a typical prior art storage and loading systems in use.

Referring to FIG. 3, typical prior art commodity storage and loading facilities 20 include a storage bin 22, a loading system 24, an actuator 26 for controlling flow of the commodity 28, and a commodity outlet 30. The commodity outlet 28 is typically located over an open area in which a transport vehicle 32 having a transport bin 34 can be located for a filling the transport bin 34 with the commodity 28. The loading system 24 typically includes an existing control box 40 having components such as a power system and motor and/or gate controllers such as a starter, relay switch, or a PLC. The operator 36 must typically activate the flow of commodity by leaving the vehicle cab 38 and turning the loading system 24 on at control box 40, thereby controlling the movement of actuator 26 for opening/closing a gate, or turning on/off an auger or belt, or other known components of a loading system 24.

The operator 36 must also typically monitor the loading of the commodity 28 into the transfer bin 34 to ensure all sections of the transport bin are filled to the desired capacity. To ensure proper loading and desired fill, the operator 36 typically climbs a grain bin ladder (not shown) or a vehicle ladder 44, requiring the operator to leave the vehicle cab 38 and the control box 40. However, as a section of the transport bin 34 fills near capacity with commodity 28, the operator must then return to the vehicle cab 38 to reposition the vehicle 32 so that the outlet 30 is then located over a section of the transport bin 34 that has additional capacity remaining. Inconveniently, in order to fill to capacity typical lengthy transport bins 34, this process of the operator 36 leaving the cab 38, climbing the ladder 44, and returning to the cab 38 to reposition the vehicle 32 and transport bin 34 must be repeated multiple times, risking injury, exposure to dust and other allergens, and, for high speed loading systems 24, risking overflow of the commodity 38 from the transport bin 34. Although some prior art facilities 20 include a outlet 30 which is capable of being translated along the length of transport bin 34, thus reducing or eliminating the need to reposition vehicle 32, such system still require the operator 36 to leave the cab 38 to monitor the filling of transport bin 34 and to control the positioning of the outlet 30.

Figure 4:
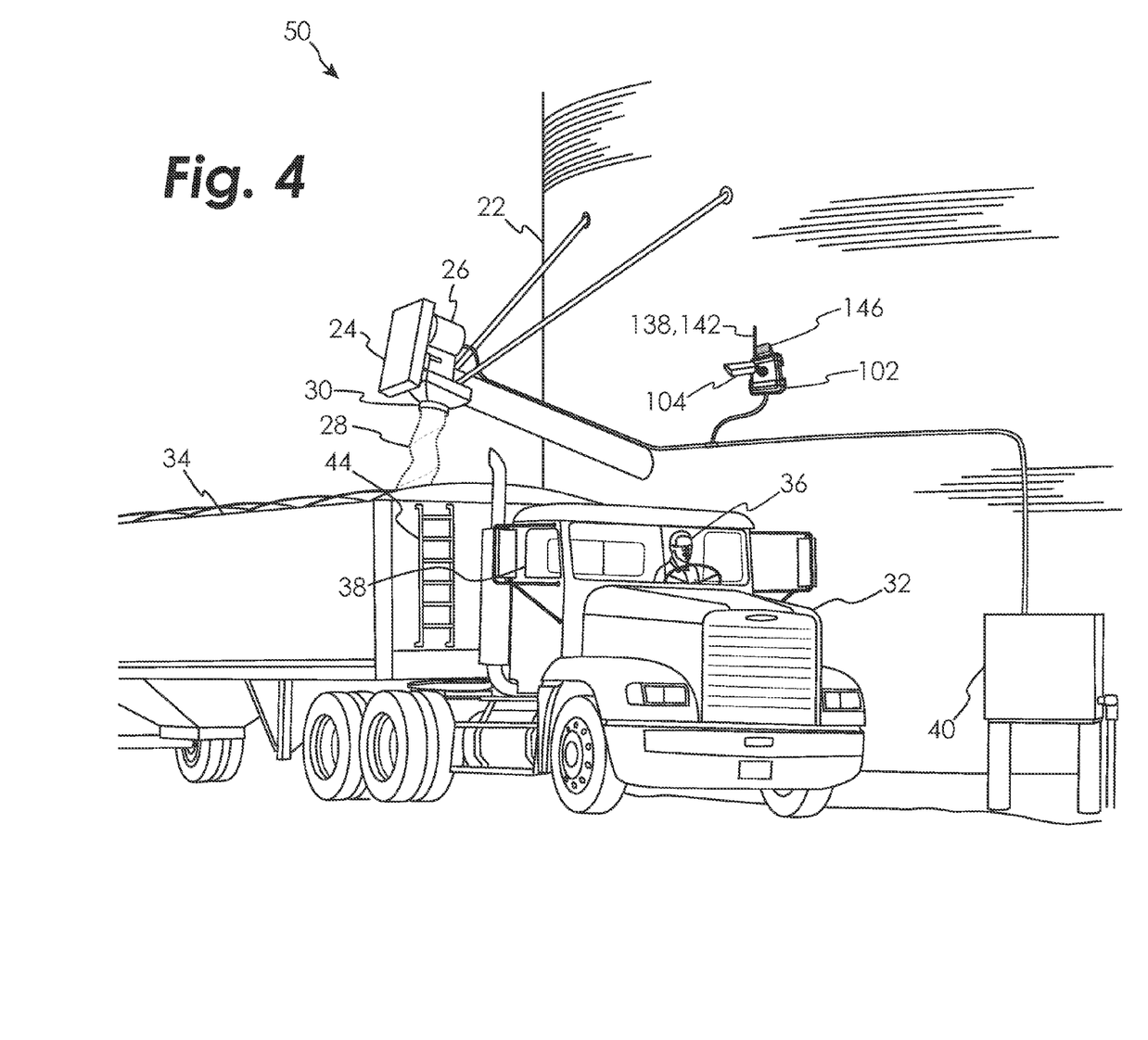
FIG. 4 illustrates the commodity storage and loading system of FIG. 3 adapted with the illustrative monitoring and control system of FIGS. 1 and 2.
Figure 6:
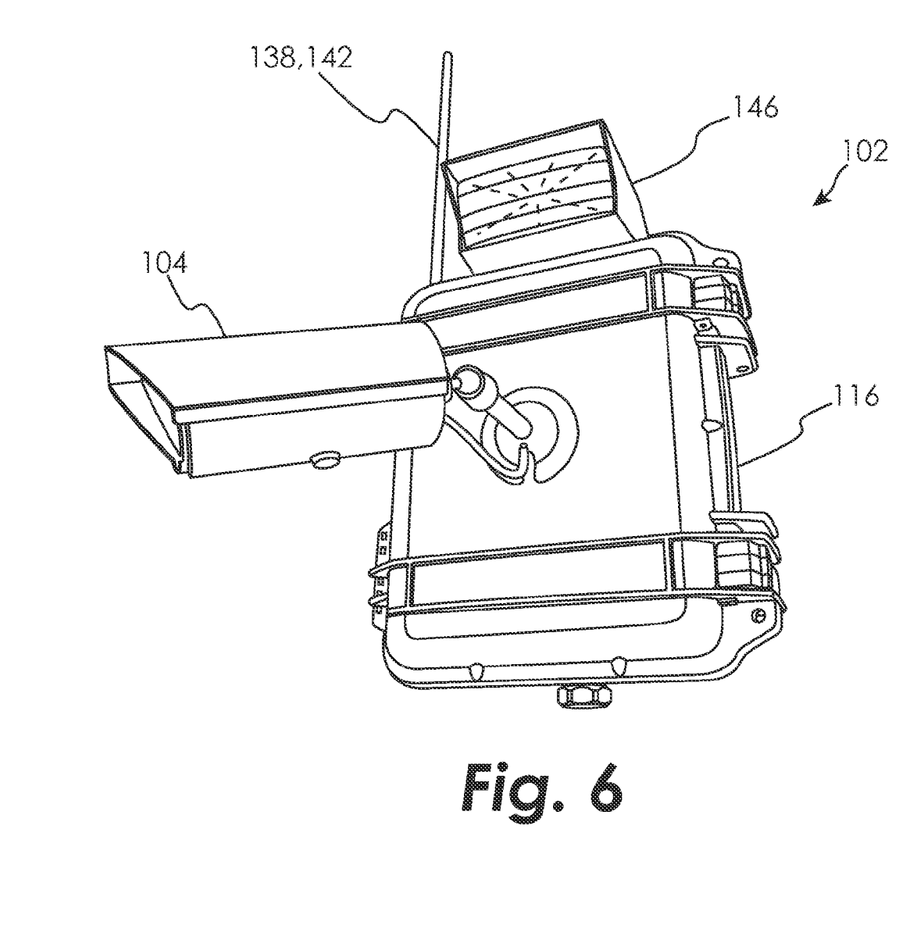
FIG. 6 illustrates a close up view of the commodity storage and loading system portion of the illustrative monitoring and control system of FIGS. 1-2 and 4.

An illustrative embodiment of a commodity storage and loading facility 50 according to the present invention is illustrated in FIG. 4. The facility can include the storage bin 22, loading system 24, actuator 26, commodity outlet 30, and control box 40, whether part of the prior art system or added, however, the facility 50 further includes an illustrative monitoring and control system 100 (FIGS. 1 and 2) having a loading system control device 102 and one or more imaging devices 104 and 106 associated with the facility 50, and a user interface device 110 associated with the operator 36 and/or transport vehicle 32. Referring to FIGS. 4 and 6, the loading system control device 102 can be substantially or entirely associated with a weatherproof enclosure 116. For example, the enclosure 116 can house various components (described below) of the control device 102 and can be used to mount components external to the enclosure such as imaging device 104, indicator lamp 146, one or more antennas 138 and 142, and an optional wired communication link port (not shown), for example an Ethernet connecting port. Such a connecting port can be used to provide set-up and maintenance for monitoring and control system 100, or for a wired portion of the system 100, for example, to provide image feeds 112 and 114 to an alternative display, for example, located at a supervisory location.

Figure 2:
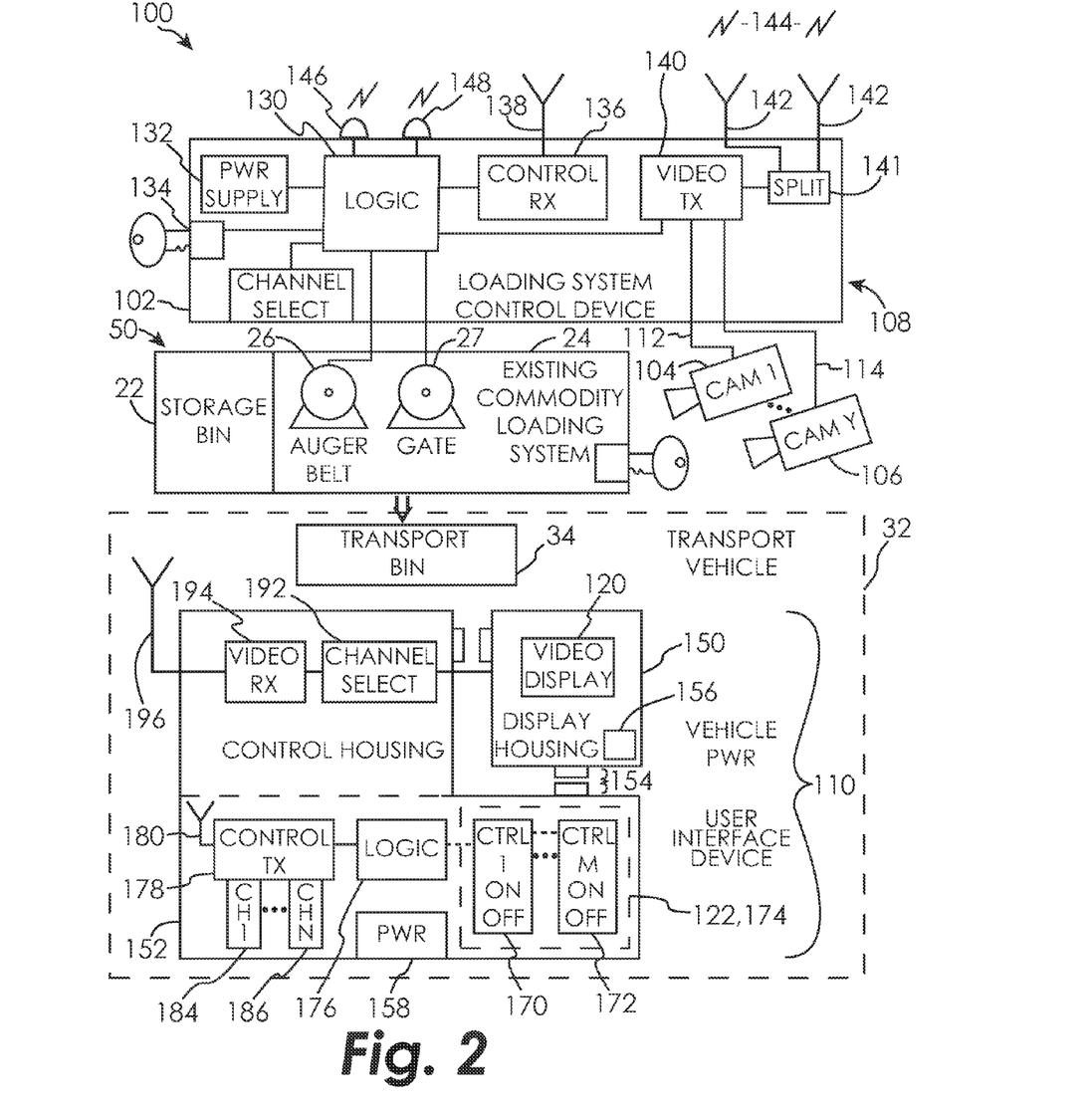
FIG. 2 is a schematic block diagram of the monitoring and control system of FIG. 1.

Referring to FIG. 2, the loading system control device 102 is adapted to transmit one or more visual feeds (periodic images or video stream) 112 and 114 from the one or more image devices 104 and 106 and to control the commodity loading system 24, for example auger or belt motor or other actuator 26 and/or bi-directional gate motor 27 (FIG. 5), for example, as is used on an overhead gravity feed loading system. One or more of the imaging devices 104 and 106 may be adapted to provide a discernable visual feeds 112 or 114 in a low or no light environment.

Figure 5:
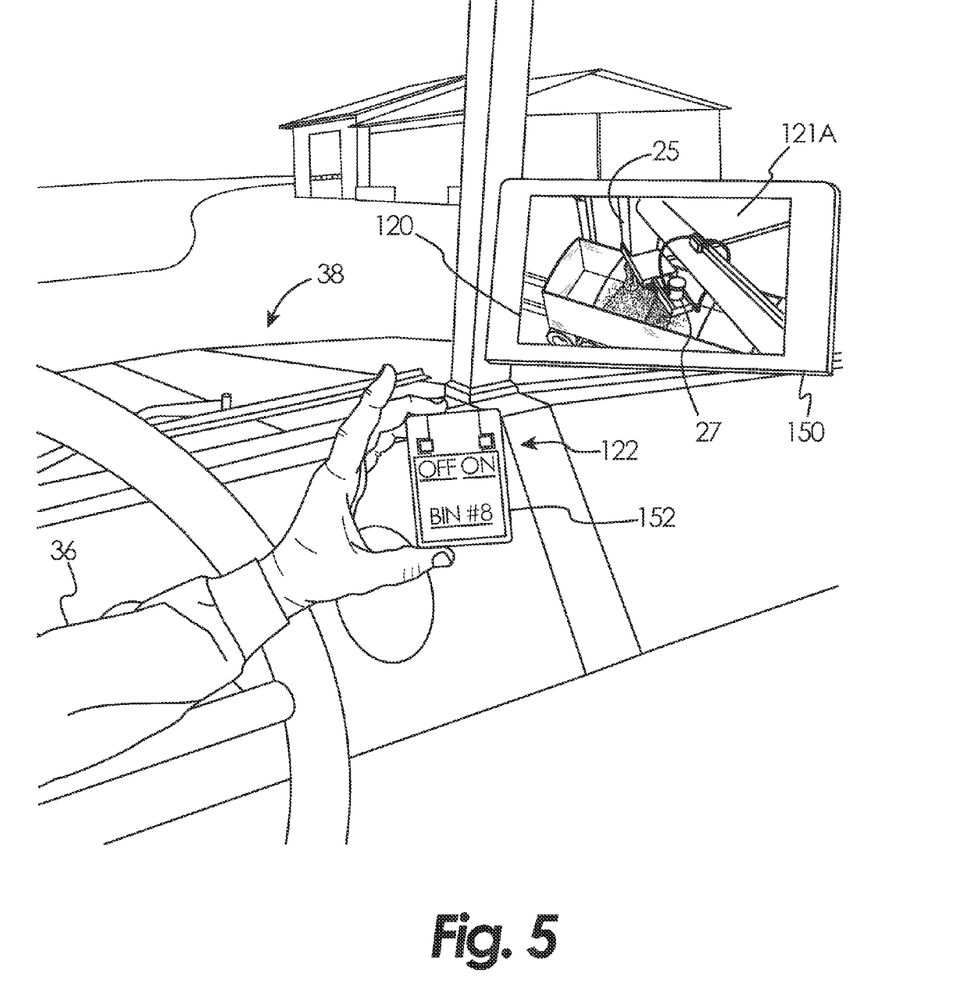
FIG. 5 illustrates the in-cab transport vehicle portions of the illustrative monitoring and control system of FIGS. 1-2 and 4.

Referring to FIG. 5, one embodiment of the illustrative monitoring and control system 100 includes a user interface device 110 having a separate display housing 150 and control housing 152, both accessible by the operator 36, for example, for use as a handheld and/or mounted unit(s) from inside vehicle cab 38. The display housing 150 includes a display for viewing at least one of the visual feeds 112 and 114 of the commodity 28 loading and/or loaded into the transport bin 34. The control housing 152 includes a switch array 122 having one or more soft or hard switches for controlling the commodity loading system 24. Optionally, the display housing 150 and/or control housing 152 may also include one or more soft or hard switches for selecting between the visual feeds 112 and 114 and other optional image and control features discussed below.

Advantageously, the user interface device 110 and the loading system control device 102 can be adapted to communicate wirelessly, for example, via RF, thereby allowing the loading system control device 102 to be associated with the commodity loading system 24. For example, the loading system control device 102 can be mounted on the side of the commodity bin 22 (FIG. 4) in an advantageous vantage point for image device 104 to capture an image feed 112 of the interior of the transport bin 34 being loaded with commodity 28 while the user interface device 110 is in wireless communication from the vehicle cab 38 with the loading system control device 102. In one illustrative embodiment, the control housing 152 includes a typical RF fob similar to those used for remote automotive locking and unlocking.

Figure 8A:
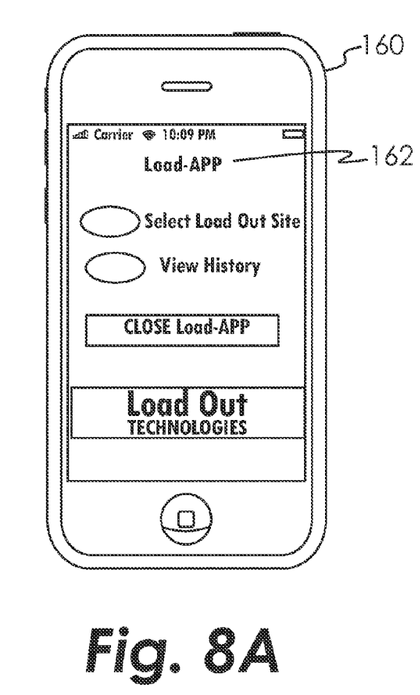
FIG. 8A-8C illustrate a handheld mobile device adapted to provide the remote user interface portion of the monitoring and control system of FIGS. 1-2 and 4.
Figure 8B:
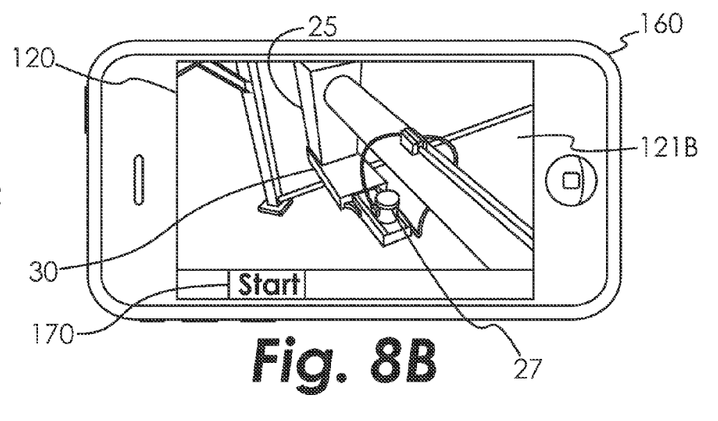
Figure 8C:
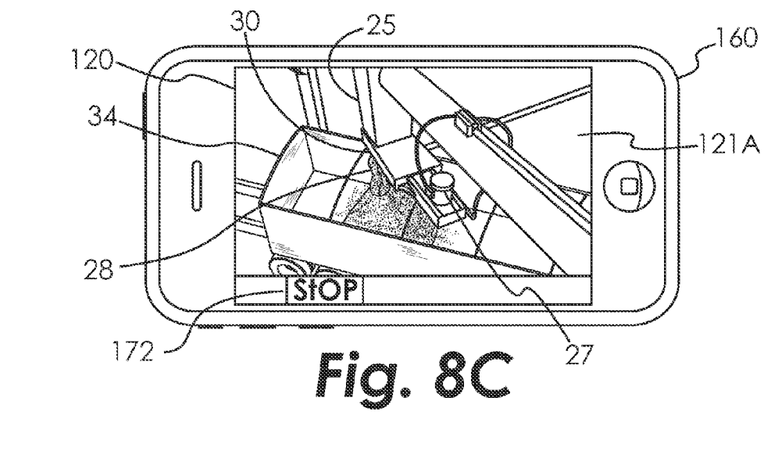

In an alternative illustrative embodiment shown in FIGS. 8A-8C, the user interface device 110 includes a handheld mobile device 160 providing the display 120, the soft or hard switch array 122, and wireless communication with the control device 102. For example, handheld mobile devices 160 such as those available from Apple, Inc. of Cupertino, Calif., or Palm, Inc. of Sunnyvale, Calif. The handheld mobile device 160 can be enabled by an application 162 implementing the control features and methods disclosed herein. For example, the handheld mobile device 160 can utilize a web browser or other standard software to access monitoring and/or control features of the loading system device 102 via the internet or other IP connection, or specific software, for example, implemented as an "app" 162 to provide monitoring and/or control, for example, such as those features and methods disclosed herein.

For example, referring to FIG. 8A-8C, an exemplary mobile device 160 is shown equipped with a web browser or application 162 to provide interfacing with the control device 120, including for example a webserver or other internet software communications application associated with control device 120. Referring to FIG. 8A, the application 162 can provide selection from among one of a number of facilities 50 equipped with a monitoring and control system 100, either by geographic location of the mobile device 160, wireless in range, by operator 36 entry, or by operator 36 authentication. The application 162 may also provide frequency selection for communication links 164-166 and login capability. Additionally, the application 162 can provide selection of history or other relevant data and communications, for example, data relating to a specific single or set of facilities 50 or transport bins 34, email, scheduling information, etc. Once the facility 50 is selected, an image feed 112 provides a view 121B suitable to align transport bin 34 under commodity outlet 30.

In some embodiments, outlet 30 may be moveable, and monitoring and control system 100 may be enabled to control the location of outlet 30 relative to transport bin 30. One or more soft switches 170 and 172 provided by application 162 can provide stopping, starting, movement, or other functioning available from the loading system 24. For example, once transport bin 30 is properly positioned under outlet 30, soft switch 170, for example having a green background and the word "Start", can be touched to enable flow of commodity 28 into transport bin 34 by activating the logic switching unit 130 to activate actuator 27. As shown in FIG. 8C, by monitoring view 121A, as loading proceeds, the transport bin 34 or outlet 30 can be moved relative to one another as required, and the flow of commodity 28 can be stopped by touching soft switch 172, for example, having a red background and the word "Stop".

In one embodiment, a keep alive safety soft switch (not shown) must be pressed periodically, or an automatic signal otherwise periodically sent from mobile device 160 before the expiration of a preset timer, else the logic switching unit 130 activates actuator 26 to terminate the flow of commodity 28. Such a feature, or other alternative safety features, can terminate flow of commodity 28 in the event of lost communication between the user interface device 110 and control device 102, or in the event of the extended lack of attention of the operator 36 to the loading process. Other features may also be provided and/or be selectable from the mobile device 160 or other user interface device 110, for example, weight measured by a scale located under the transport bin 34, flow or volume measurements for commodity 28 provided by loading system 24, moisture measurements provided by a sensor associated with the loading system 24, outside audio of the loading process, and other data or information relating to the commodity 28, environment, or transport bin 34 or vehicle 32.

The user interface device 110 can be used to communicate with the loading system control device 102 via any communication link known in the art, including for example, a communications link 164 such as Bluetooth, a LAN 166 such as IEEE 802.11, and/or a WAN 168 such as a cellular communications network or the internet. In one illustrative embodiment the user interface device 110 includes a handheld mobile device 160 as discussed above to provide the image stream monitoring viewable from within the vehicle cab 38 and a separate remote RF "key fob" control housing 152 to provide the control of the loading system device 102 from within the vehicle cab 32, for example, to initiate and terminate the flow of commodity 28 into the transport bin 34.

Referring to FIG. 2, the loading system device 102 may include a logic switching unit 130 for selectively operating the loading system 24, for example, including actuators 26 and 27 such as motors or other actuators for operating an auger, a belt, an outlet gate, or a translator for an outlet gate, all of which control transfer of the commodity from the storage bin 22. For example, the logic unit 130 may include one or more of a PLC, relay, motor starter, PC or other electronic control and/or switching components and systems known in the art. Alternatively or additionally, to the extent the existing control box 40 or control receiver 136 (discussed below) provides such components and functions for switching the one or more actuators 26 and 27 (or starters associated with such actuators), the control box 40 and/or receiver 136 may supplement or serve as the logic unit 130. For example, a two channel remote control receiver such as part number 2CH-SRX, available from ABACOM Technologies of Toronto, Ontario, Canada, can be adapted to generally perform some or all of the functions of control receiver 136 and logic 130.

The illustrative loading system device 102 may be activated by providing electrical power to power supply 132 and/or by activating a security and safety feature 134, for example a key, pass code, or card activated software or hardware switch. Additionally, feature 134 may include more than one function/position so that the operator can select whether to activate and/or power one or any combination of the control box 40, the loading system device 102, and the image feed device 108 (discussed below).

One or more optional indicators 146 and 148, for example lights, can provide status information regarding the loading control device 102 and/or loading system 24 components. For example, the first indicator 146 can indicate power is supplied to the loading control device 102, and the second indicator 148 can indicate that the security and safety feature 134 has been satisfied to activate the loading control device 102.

Advantageously, loading system control device 102 includes an antenna 138 and receiver 136 for receiving control signals from the user interface device 110. The control signals are processes by logic switching unit 130 for controlling activation and deactivation of the one or more actuators 26 and 27 that control the flow of commodity 28 from storage bin 22 through loading system 24 and into the transport bin 34.

Advantageously, the monitoring and control system 100 also includes one or more imaging devices 104 and 106, for example video or IP cameras that provide visual feeds 112 and 114 to a video transmitter 140. An optional image feed device 108 (which may be optionally separate from the loading system control device 102) can include a video transmitter 140, an optional signal splitter 141, and one or more antennas 142 to provide an image feed separate from the communication links 164-168. The video transmitter 140 may be, for example, a 2.4 MHz system as is known in the art and that provides one or more wireless video signals 144 that are transmitted to the user interface device 110 for remote viewing of the loading operation. As for loading system device 102, the image feed device 108 may be activated by providing power to power supply 132, for example, by the activation of the a security and safety switch 134, discussed above. Additionally or alternatively, operation of the image feed device 108 may also be separately activated or otherwise controlled, for example, by user interface device 110 and logic switching unit 130. If required, the antennas 138 and 142 may be mounted external and/or internal to the enclosure 116. In one illustrative embodiment all communications between the loading system control device 102 and user interface device 110 are provided by one of communication links 164-168. In another illustrative embodiment at least some of the communications between the loading system control device 102 and user interface device 110 are provided as wired connections.

Referring to FIG. 2, one illustrative embodiment of the user interface device 110 includes a display housing portion 150 including a display 120, and a control housing portion 152 including a control transmitter 178, a battery power source 158, and a control switch array 122. The display housing 150 or control housing 152 may also house components associated with the display 120, including for example, the antenna 196, the video receiver 194, and a channel selector 192. Optionally, the control housing portion 152 can be physically separated into two devices, in which case the display housing 150 would also include its own power source 156. In FIG. 5, a display housing 150 is illustrated mounted in the cab 38 of the transport vehicle 32, for example using a windshield suction mount (not shown); however, other mounting or location of the display housing 150 can be utilized, for example, the display housing 150 can be located outside of the vehicle 32 but accessible or viewable from the vehicle cab 38.

The display housing 150 can include a display 120, for example a TFT or LCD display and a power supply 156, for example, powered by vehicle or battery power. The signals 144 transmitting the one or more visual feeds 112 and 114 are received by receiver 194 and displayed on display 120 so that the operator 36 can remotely monitor the operation of the commodity loading system 24 and the volume of commodity 28 loaded into the transport bin 34. If more than one visual feed 112 and 114 is provided, the feeds 112 and 114 can be selectively displayed on display 120, for example, as selected by the logic or switch setting associated with the channel select 192. For example, as show in FIG. 4, a first view 121A associated with image feed 112 is displayed and subsequently, by timer logic associated with the channel select 192 or by the operator making a switch selection associated with channel select 192, a second viewing angle or location associated with the visual feed 114 can be displayed. Optionally, more than one of the one or more visual feeds 112 and 114 can be displayed simultaneously on display 120.

Figure 1:
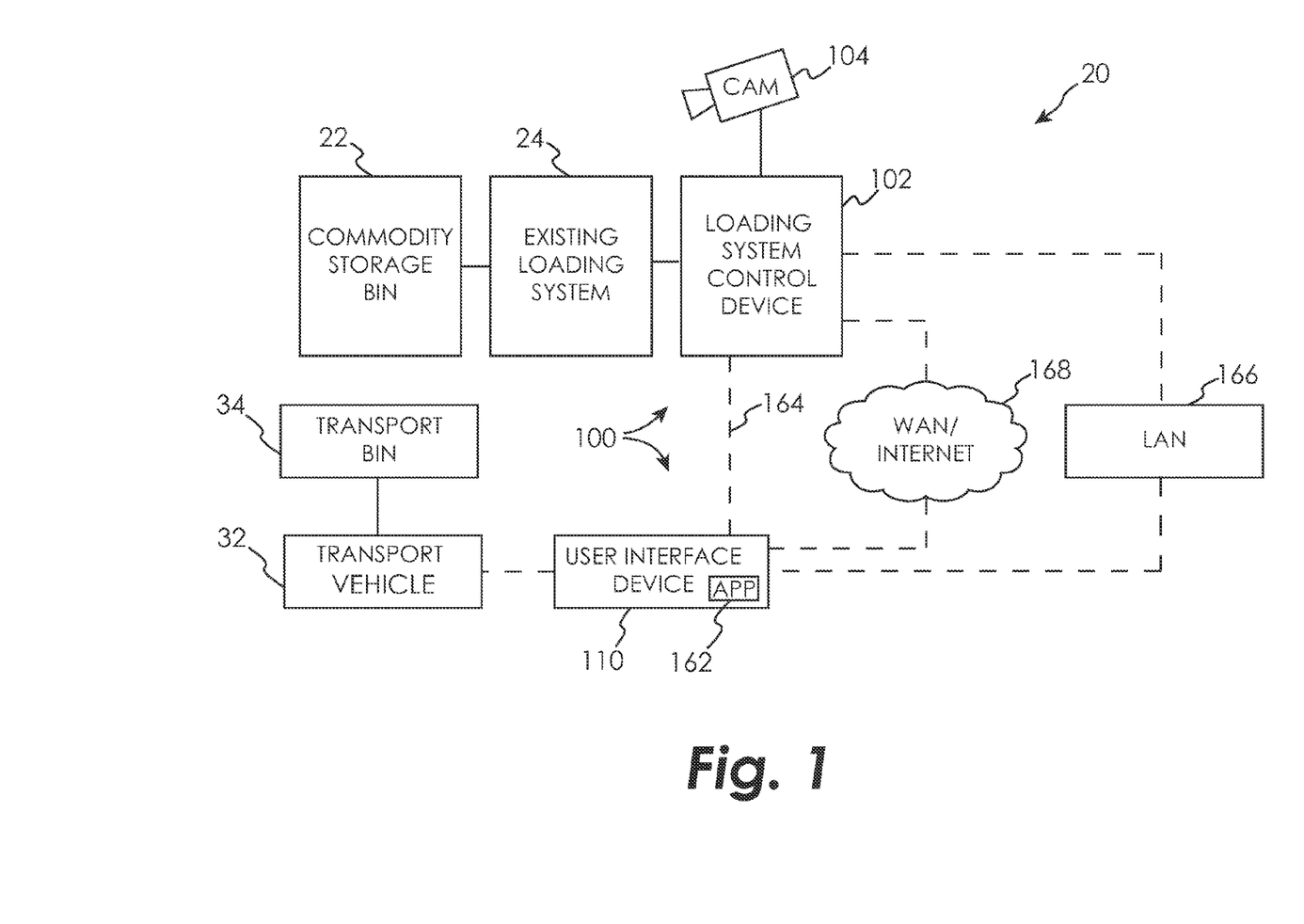
FIG. 1 is an overview schematic block diagram of a commodity storage and loading system having an illustrative monitoring and control system for commodity loading.

Additionally and optionally, as shown in FIG. 1, the control housing 152 (or the one or both control housing if in separate housings as discussed above) that houses the switch array 122 and channel select 192 may selectively detached from the display housing 150 using releasable coupling(s) 154, for example hook and loop fasteners, thereby allowing the operator 36 to carry the control housing 152 (and associated switch array 122) out of the vehicle cab 38. Advantageously, the control housing 152 can include battery power 158, logic 176 for receiving and processing signals from the one or more switches 170 and 172 of switch array 122, and transmitter 178 and antenna 180 for transmitting loading system control signals to the control receiver 136 of the loading system control device 102, thereby remotely controlling the operation of the commodity loading system 24. In some embodiments of the user interface device 110, the logic 176 may be provided by software, for example, an application 162 associated with a hand held mobile device 160. Additionally, the control housing 152 may include a safety device(s) 174, for example a locking device or a movable cover over switch array 122, to prevent inadvertent actuation of the switches 170 and 172. The control housing 152 may also include lights or other indication device(s) relating to the status of the loading system 24, the loading system control device 102, and/or the wireless communication connection with the loading control system 102. Optionally, the control housing 152 can be weatherproof.

Because it may be desirable for one user interface device 110 be operable with more than one loading system control device 102 at a single facility 50 or at various different facilities 50, the control transmitter 178 can have one or more associated modules 184 and 186 or software selectable key or other parameter that enables the user interface device 110 to be associated with a particular loading system control device 102. For example the modules 184 and 186 may each provide a selected channel, frequency, code, or key. Additionally or alternatively, an input device associated with the control housing 152 may be used to enter the proper key, for example a key pad, magnetic strip reader, RF ID device, finger print reader, touch screen, or the like. The user interface device 110 may also include labeling or changing indication/indicator associated with the specific facility 50, for example the specific storage bin(s) 22 or actuator(s) 26 and 27 associated with the selected commodity loading system 24.

In an alternative embodiment of the present monitoring and control system, the user interface device 110 is mounted in the environment of the loading system 24 and commodity storage bin 22 such that it can be accessed through the window of the cab 28 of the vehicle 32 to have its bin 34 filled. For example, the user interface device 110 may be mounted to the ground similar to a drive up ATM, or could be suspended from a movable boom and/or cable. Thus, the user interface device 110 can be operated from the cab 28, but need not remain in the cab 28, or be wireless.

Alternatively, the control receiver 136 and controller transmitter 178 may be transceivers for bi-directional communication. Also alternatively, the video receiver 194 and video transmitter 140 may be transceivers for bi-directional communication. Also alternatively, the control receiver 136 and video transmitter 140 may be a single combined unit transmitting and receiving a combined or alternating signal 144, for example, over communication links 164-166. Similarly, also alternatively, the control transmitter 178 and the video receiver 194 may be a single combined unit transmitting and receiving a combined signal.

The illustrative monitoring and control system 100 may also include wireless transmission techniques, including those using multiple frequencies, that provide secure transmissions, and security features to limit use to those authorized for access, including for example, passwords, keyed controls, finger print detection activation, and daytime only activation. The monitoring and control system 100 may also include alternative visual display devices, for example, larger screens provided in the area of the vehicle cab 28, visual display of multiple camera angles, and the ability to utilize more than one system simultaneously within a single commodity operation area. The monitoring and control system 100 may also include an alternative imaging device (not shown) source, for example, one mounted on the vehicle and positioned to show the interior of transport bin 34.

Figure 7A:
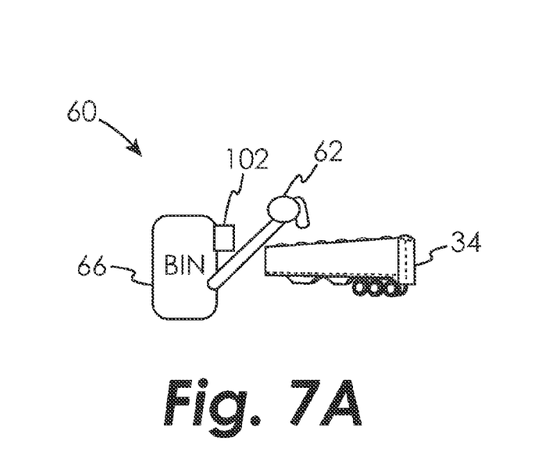
FIGS. 7A-7D illustrates some other illustrative combinations of commodity storage and loading systems adapted with the illustrative monitoring and control system of FIGS. 1 and 2.
Figure 7B:
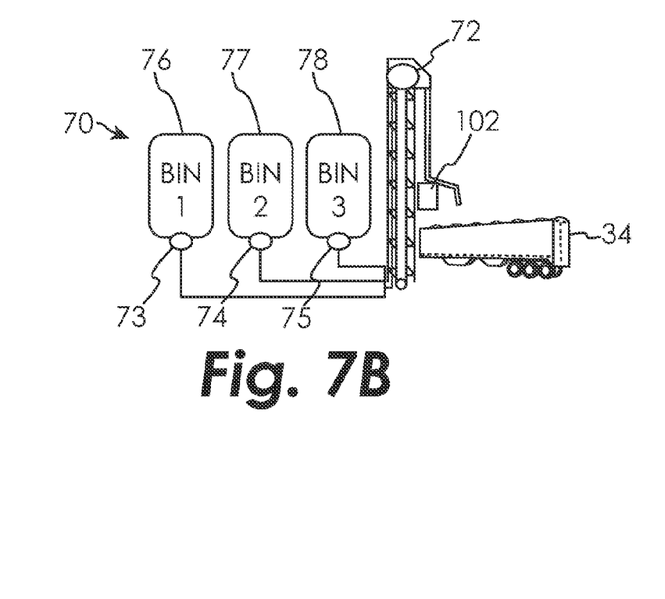
Figure 7C:
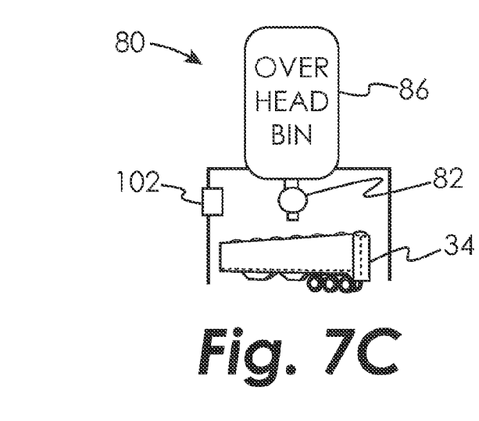
Figure 7D:
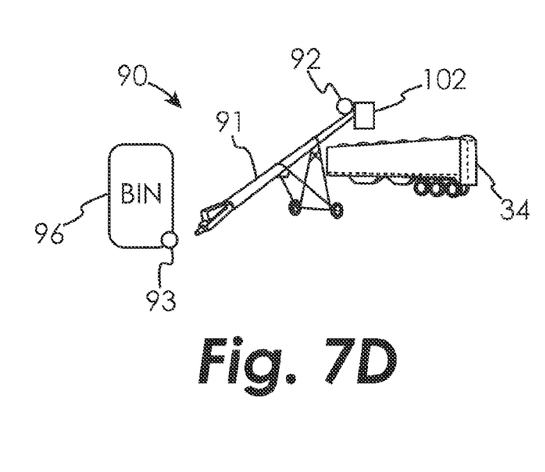

The loading facilities 50 for which the monitoring and control system can be associated are not limited to the above illustrative embodiments, but can be adapted to other loading facilities. For example, referring to FIGS. 7A to 7D, typical loading facilities include facilities 60, 70, 80, and 90. As illustrated in FIG. 7A, a facility 60 includes a single auger motor 62 controlled by control device 102 that provides selective flow of commodity 28 from a single storage bin 66. As illustrated in FIG. 7B, a facility 70 includes a single elevator motor 72 (or multiple motors if multiple elevators) and bin actuators 73, 74, and 75 that are selectively controlled by control device 102 to provide selective flow of commodity 28 from one or more of storage bins 76, 77, and 78. As illustrated in FIG. 7C, a facility 80 includes a single gate actuator 82 controlled by control device 102 that provides selective flow of commodity 28 from a single gravity feed storage bin 86. As illustrated in FIG. 7D, a facility 90 includes a loading system control device 102 mounted on portable auger unit 91 having a single auger motor 62 controlled by control device 102 that provides selective flow of commodity 28 from a single storage bin 96. The bin 96 may also include a motor or other actuator 93 that can be optionally controlled by control device 102. In another alternative embodiment to that illustrated in FIG. 7D, the portable auger unit 91 in FIG. 7D is operated from a PTO driven tractor or other machine and the bin actuator 93 is controlled by the control device 102.

The monitoring and control system 100 is equally applicable and adaptable for use with unloading or dump facilities (not shown) known in the art and remotely monitoring and controlling the unloading of commodity and the associated actuators/process (not shown).

While the invention has been illustrated and described in detail in the foregoing drawings and description, the same is to be considered as illustrative and not restrictive in character, it being understood that only illustrative embodiments thereof have been show and described and that all changes and modifications that are within the scope of the claimed subject matter is desired to be protected.

The invention claimed is:

1. A system for in-vehicle monitoring and control of a loading system of a commodity loading facility, comprising:
    a control device adapted to interface with the loading system of a commodity loading facility, the control device having a switching unit, an imaging device, and a communication link;
    the switching unit interfaced with the communication link and capable of selectively operating the loading system to transfer commodity from at least one storage bin of the loading facility, through an outlet, and into a transport bin of a vehicle being loaded;
    the imaging device interfaced with the communication link and positionable to provide a visual feed of the interior of the transport bin during loading;
    a user interface device accessible from within the cab of the vehicle being loaded;
    the communication link interfacing the user interface device to the control device;
    the user interface device having at least one switch operable to control the switching unit to thereby enable an operator located in the cab of the vehicle being loaded to initiate and terminate the loading of commodity into the transport bin of the vehicle being loaded; and
    the user interface device having a display for displaying to the operator located within the cab of the vehicle being loaded, the visual feed of the of the interior of the transport bin during loading of commodity, thereby enabling the operator to monitor from within the cab the commodity being loaded into the transport bin and to reposition the transport bin relative to the outlet to fill different sections.

2. The system of claim 1, wherein the user interface device further comprises a security feature for limiting control of the loading system control device to authorized operators.

3. The system of claim 1, wherein the user interface device is positioned relative to the loading system such that the user interface device is accessible through the window of the vehicle cab associated with the transport bin.

4. The system of claim 1, wherein the imaging device is mounted on one of the vehicle and the transport bin.

5. The system of claim 1, wherein the control device includes a lost communication timer adapted to deactivate the flow of commodity from the storage bin upon the absence of a communication from the user interface for greater than a preset period of time.

6. The system of claim 1, wherein the control device is further adapted to interface with the storage bin to control the position of the flow of commodity from the storage bin relative to the transport bin and the user interface device further includes at least a second switch for selectively causing the control device to move the position of the flow.

7. The system of claim 1, wherein the user interface is adapted to provide selection of a desired storage bin from a plurality of storage bins.

8. The system of claim 1, wherein the communication link includes a wireless communications link.

9. The system of claim 8, wherein the user interface device includes a handheld mobile device.

10. The system of claim 9, wherein the handheld mobile device displays the visual feed.

11. The system of claim 10, wherein the at least one switch operable to control the switching unit comprises at least one soft switch provided by the handheld mobile device.

12. The system of claim 10, wherein the user interface device further includes a handheld RF fob transmitter, including the at least one switch operable to control the switching unit.

13. A system for monitoring and controlling commodity loading from a commodity loading facility storage bin into a vehicle transport bin, comprising:
    a control device adapted to interface with the commodity loading facility to activate and deactivate a flow of commodity from a stationary outlet coupled to the storage bin;
    an imaging device positionable to provide a visual feed of the interior of the transport bin during loading;
    a user interface accessible from within a cab of the vehicle being loaded; and
    a communication link coupling the user interface to the control device and the imaging device;
    wherein the user interface includes a display for displaying within the cab of the vehicle being loaded, the visual feed received from the imaging device, and at least one switch for selectively causing the control device to activate or deactivate the flow of commodity from the storage bin, thereby enabling an operator of the vehicle transport bin to activate and deactivate the flow of the commodity, view the visual feed of the interior of the transport bin during loading, and reposition the vehicle transport bin relative to the outlet to fill different sections of the transport bin, all from a cab of the vehicle being loaded.

14. The system of claim 13, wherein the user interface includes a handheld wireless device having software code enabling the display, the at least one switch, and communication with the control device and imaging device.

15. The system of claim 13, wherein the communication link includes a wireless communications link.

16. The system of claim 15, wherein the user interface device further includes a handheld RF fob transmitter, including the at least one switch.

17. The system of claim 15, wherein the control device includes a lost communication timer adapted to deactivate the flow of commodity from the storage bin upon the absence of a communication from the user interface for greater than a preset period of time.

18. The system of claim 15, wherein the user interface device includes a handheld mobile device adapted to display the visual feed.

19. The system of claim 18, wherein the at least one switch comprises at least one soft switch provided by the handheld mobile device.

20. A method of filling a transport bin with commodity from one of a plurality of storage bins, comprising:
- from the cab of the transport bin, using a user interface to select one of the plurality of storage bins;
- providing to the cab of the transport bin a visual feed of the area under the outlet gate of the selected one of the plurality of storage bins;
- positioning the transport bin under the outlet of a selected one of the plurality of storage bins;
- from the cab, a user interface activating the flow of commodity through the outlet and into the transport bin;
- from the cab, monitoring the visual feed, thereby monitoring the filling of the transport bin;
- from the cab, as required, repositioning of the transport bin such that the outlet fills different sections of the transport bin with commodity; and
- from the cab, the user interface deactivating the flow of commodity from the outlet.

\* \* \* \* \*